United States Patent [19]
Pedroso

[11] 4,100,419
[45] Jul. 11, 1978

[54] SAFETY INTERLOCK DEVICE

[75] Inventor: Raul Pedroso, Miami, Fla.

[73] Assignee: Coulter Electronics, Inc., Hialeah, Fla.

[21] Appl. No.: 784,663

[22] Filed: Apr. 5, 1977

[51] Int. Cl.² .......................... G21F 5/04; G21K 1/02
[52] U.S. Cl. ................................ 250/514; 250/515; 350/266
[58] Field of Search .............. 250/514, 515, 496, 513, 250/505; 350/266

[56] References Cited
U.S. PATENT DOCUMENTS

| | | | |
|---|---|---|---|
| 3,009,138 | 11/1961 | Lindsay | 250/514 |
| 3,418,475 | 12/1968 | Hudgens | 250/514 |
| 3,567,941 | 3/1971 | Russell et al. | 250/514 |
| 3,721,826 | 3/1973 | Thomas | 250/496 |
| 4,027,156 | 5/1977 | Robinet | 250/514 |

*Primary Examiner*—Bruce C. Anderson
*Attorney, Agent, or Firm*—Silverman, Cass & Singer, Ltd.

[57] ABSTRACT

A defeatable safety interlock device for blocking radiation from an instrument when a portion of the protective housing therefor is removed or displaced. When defeated, it is not possible to remove or displace the interlocked portion of the protective housing, nor is it possible to replace that interlocked portion during such defeat. The interlock device includes a shutter, a locking pin and a latch. The shutter blocks the radiation upon activation of the interlock device and controls the position of the locking pin. The latch is secured to the displaceable portion and includes a slotted portion movable in a restricted path, the passage being controlled by the position of the locking pin. The locking pin is seated in a slotted ramp movable with the shutter to raise and lower the pin relative to the path followed by the slotted portion of the latch.

14 Claims, 7 Drawing Figures

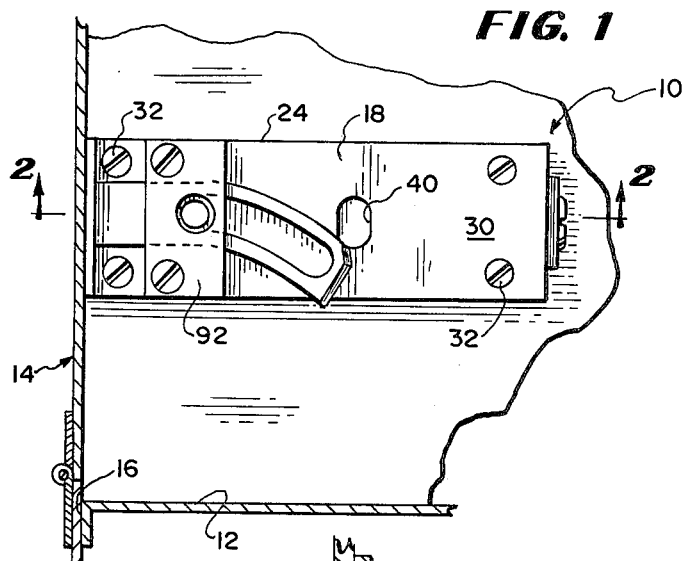
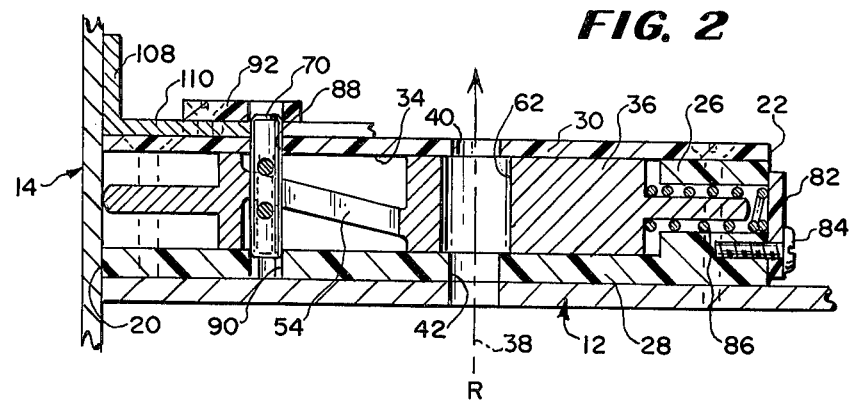
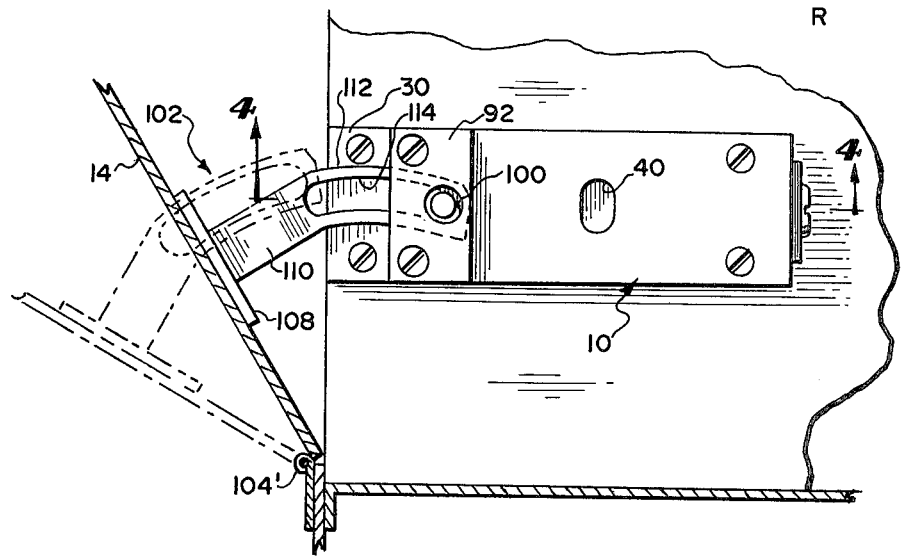
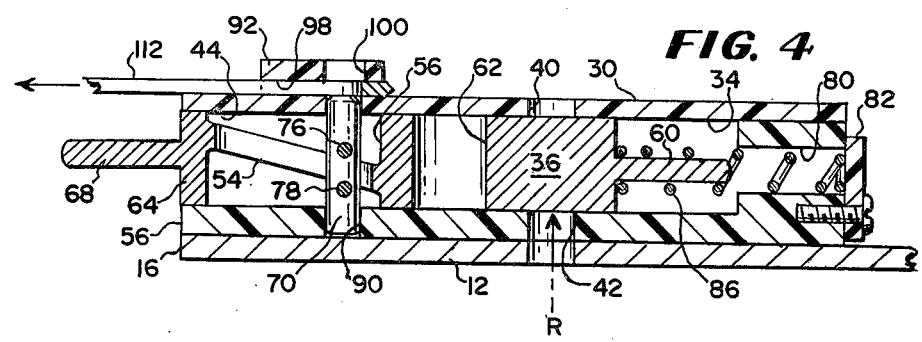

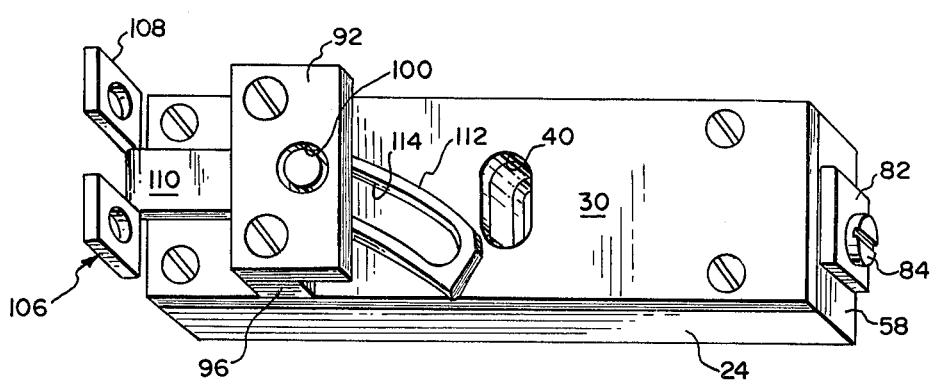
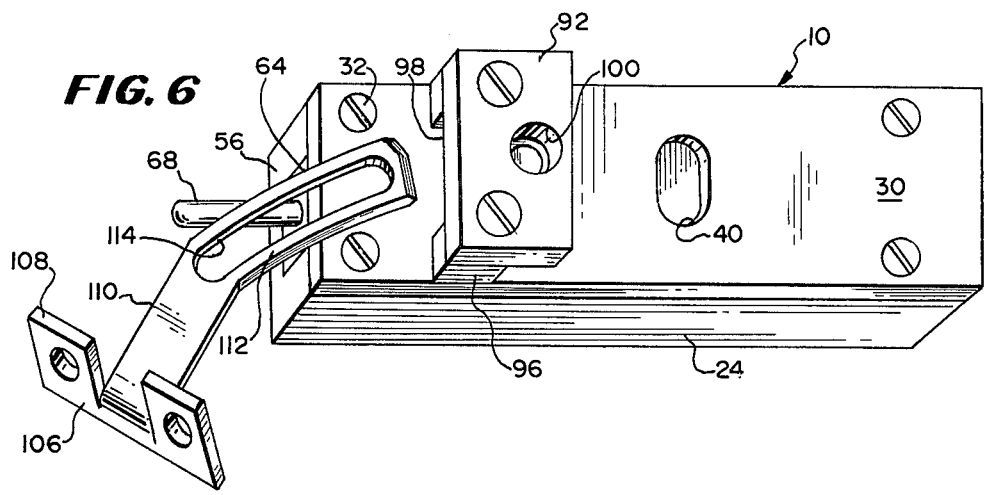
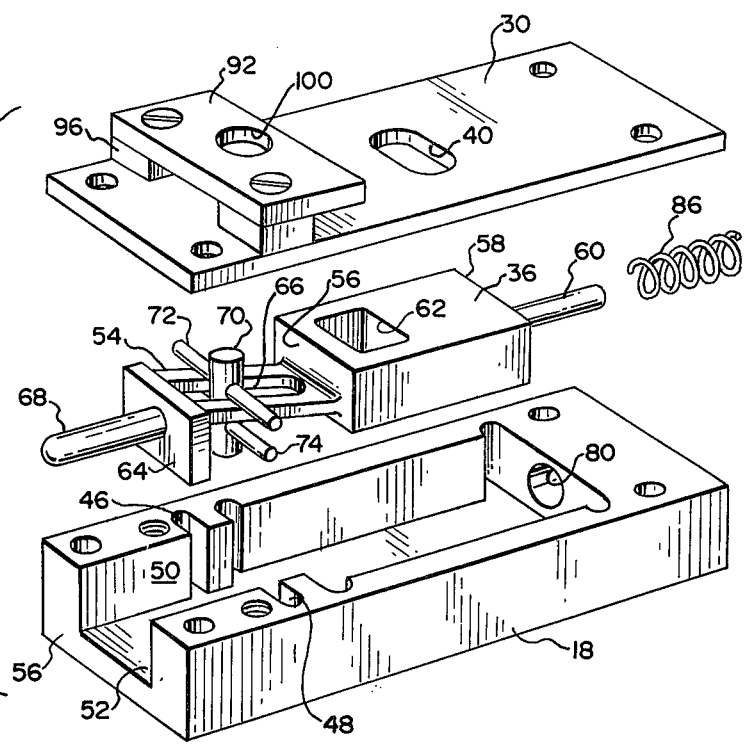

SAFETY INTERLOCK DEVICE

BACKGROUND OF THE INVENTION

This invention relates generally to safety interlock devices utilized to prevent human access to direct or collateral radiation upon removal or displacement of the interlocked portion of a protective housing enclosing such radiation. More particularly, the invention provides a mechanical safety interlock device including a shutter, for laser products, which device is defeatable but precludes removal or displacement of the interlocked portion of the protective housing upon failure or defeat of the interlock to prevent access to the laser radiation.

Products utilizing hazardous radiation must be provided with protective housings to prevent access to direct or collateral exposure to such radiation. For safety considerations such products further must be provided with safety interlock devices to prevent human access to the hazardous radiation upon removal or displacement of a portion of the protective housing as would occur for the purpose of gaining access to the interior of such housing. In addition, the interlocked portion of the protective housing must be provided with means to preclude removal or displacement thereof upon failure of the interlock to prevent human access to the direct or collateral radiation in excess of tolerated amount. Ordinarily, the safety interlock devices are permitted to be defeatable but if defeated, there must be provided a visible indication of defeat as well as means to preclude replacement of the removed or displaced portion of the protective housing so long as the safety interlock device remains defeated.

For a given product, electrical interlock switch devices are well known and widey used. These may be located in proximity to access doors and panels for actuation by the door, the panel or a latch which may actuate a leaf spring, plunger or push-button. The switch may be located in a power or control circuit or may operate a solenoid shutter or baffle in order to prevent human access to the radiation upon movement of the protective portion of the housing or latch.

Electrical interlocks are subject to failure modes involving the failure of switch contacts to make-or-break upon actuation or the failure of another component although the switch itself performed properly.

Plug type interlock devices such as used on television receivers are familiar. In the case of television receivers, the primary electrical power is delivered to the product by a plug which is integrally mounted to the portion of the housing that is to be removed for access to the interior of the product. Removal of the back cover of the receiver, removes all electrical power. Other types of plug type interlock devices may mount only a portion of an electrical circuit on the removable portion of the housing while other types may employ a single prong plug to complete a circuit. Location must be suitable and, of course varies with product. Short circuits and/or other component failures are failure mode considerations which must be taken into account.

For many products, especially those which utilize hazardous radiation such as lasers for example, they may be more suitably protected with interlock devices that are mechanical in operation using baffles or shutters which block the radiation from entering the area made accessible by removal of the housing, which frustrate a laser cavity, or remove an integrally mounted optical component, insert, attenuator, etc. Sturdiness of design and component failure modes must be considered.

In providing for an effective interlock device meeting safety standards and requirements, including government regulations, consideration must be given to all modes of possible failure which might fail to prevent access. Sticking of a push button, or leaf actuator, shorting or welding of switch contacts, failure of another component in an interlock circuit, or mechanical jamming of a shutter, for example may result in failure to preclude human access to the radiation upon removal or displacement of the protective housing or part thereof.

By their very nature, electrical interlock devices must be supplemented by provision of mechanical means such as electrically operated latches, which keep the housing secured until the electrical circuit is interrupted by opening of the contacts or of the interlock switch or the cessation of the radiation. Plug type interlocks are more effective but must depend upon proper design to preclude electrical or mechanical failure.

Another consideration in addition to possible operational failure, is the fact that any interlock system regardless of its complexity can be defeated by persons with sufficient motivation and cleverness. In fact, the system often is intended to permit defeat. Defeat may be occasioned by pushing a button or leaf spring, installing a clip lead across obvious switch terminals, pulling out of a "pull to defeat" plunger, placing tape over a push-button to hold the same in defeated condition, and the like. However, it is essential that if defeated, the safety interlock must provide a display of such defeat. The indication must be clear in its meaning and appropriate for the product and its operating environment. Visibility of a piece of tape say, holding a leaf spring depressed or a push-button recessed, may not be clear enough to satisfy safety regulations. Plug type interlock devices require the use of a by-pass for defeat. In the case of television receivers, an external power service cable can be utilized to permit operation for testing with the cover removed. Visibility is evident.

Mechanical interlocks may incorporate integral flags which indicate defeat or defeat may be accomplished by the installation of a tool which itself gives indication of defeat.

It is essential that the interlock device must be provided with means whereby replacement of the removed or displaced portion of the protective housing is precluded so long as the interlock device is defeated and remains in defeated condition. Reset means for electrical interlock devices may be provided but then cannot operate until the displaced or removed portion of the protective housing is replaced. So long as by-pass means is utilized to overcome plug type interlock devices, re-installation of the back cover, for example, is not possible. Mechanical interlock devices must be provided with means whereby replacement of the removed portion of the housing which triggered the interlock cannot be effected so long as the interlock device is defeated.

One type of product for which a safety interlock device is required involves a cabinet within which a laser beam is housed for operation through a passageway or port. Shutter means is provided to prevent passage of the laser beam through said port. Access to the laser radiation is gained by opening a door to the cabinet.

The safety interlock device desirable for such product must block the laser beam when a portion of the protective housing of the product is removed or displaced, as when the access door to the cabinet is opened. In addition, replacement of the door must be rendered impossible while the safety interlock is defeated and as well, means must be provided to preclude removal or displacement of the door, for example, upon failure of the safety interlock to prevent access to the laser radiation.

The interlock device thus provided must meet all regulatory standards concerning safety interlock systems for laser products and those other products utilizing dangerous or hazardous radiation, particularly those standards that entitle the producer to avoid required placement of supplementary safety devices and/or warning devices such as key switches, special alarms, fail-safes, etc. which would increase the cost of the product or deter users with notices and other alarm raising means.

SUMMARY OF THE INVENTION

A safety interlock device operable by a push-button which protrudes from a housing thereof when access to the laser beam is blocked and which can be defeated by restraining the push-button within the interlock housing. The interlock includes a locking pin ridable along an inclined track and controlled by the position of a shutter relative to the laser beam. An arm is attached to that portion of the protective housing whose removal is required to establish access. The passage of the arm is restrained when the interlock is defeated. When the interlock device is activated, the locking pin is retracted and the arm freely is movable. When defeated, the locking pin is caused to assume a blocking relationship relative to the arm. Once the door is closed, the interlock is defeated and the locking pin will not permit free passage of the arm. The door cannot be opened sufficiently to enable access to the extent that exposure to the laser beam is possible. Once the door is fully opened, the door cannot be closed if or while the interlock is defeated.

BRIEF DESCRIPTION OF THE DRAWINGS

FIG. 1 is a top plan view of the safety interlock device according to the invention illustrated installed within a protective housing.

FIG. 2 is a sectional view taken along lines 2—2 of FIG. 1 in and viewed in the direction indicated by the arrows.

FIG. 3 is a diagrammatic view of the safety interlock device of FIG. 1 illustrated in two stages of its operation.

FIG. 4 is a sectional view similar to the view of FIG. 2 but illustrating the condition of the said device when the interlock is activated.

FIG. 5 is an enlarged top perspective view of the safety interlock device of FIG. 1 illustrated in its condition assumed with the enclosure cabinet door closed and the device is defeated.

FIG. 6 is an enlarged top perspective view of the safety interlock device of FIG. 1 illustrated in the undefeated condition thereof.

FIG. 7 is an exploded view of the safety interlock illustrated in FIG. 5 but illustrated without the latch bracket thereof.

DESCRIPTION OF PREFERRED EMBODIMENT

Reference now is made to the drawing wherein the safety interlock device according to the invention is designated generally by reference character 10 and is illustrated in FIG. 1, as installed within a cabinet 12 having an access door 14. Cabinet 12 serves as a protective housing within which a laser beam is employed. The safety interlock device 10 is employed to limit human access to the interior of the cabinet 12 and to exposure to the laser radiation occasioned by opening of the door 14.

The safety interlock device 10 is disposed within the cabinet 12. The device 10 is installed in position either to permit passage or to block the laser beam which is employed within said cabinet 12. Preferably the one end is flush with the front edge 16 of the cabinet. The device 10 is provided with a body 18 of generally rectangular configuration. The body 18 has opposite ends 20 and 22, sides 24 and top and bottom walls 26 and 28 respectively. A cover 30 is provided for securement to the top wall 26 by suitable fastening means 32. The cover 30 need not be aligned with body 18.

A compartment 34 is defined within the body 18 to accommodate a shutter body 36 for slidable reciprocable motion between a condition blocking the passage of laser beam 38 and a displaced condition normally permitting passage of the beam. Aligned apertures 40 and 42 are formed in the cover 30 and in bottom wall 28 respectively. When the body 18 is installed within the enclosure provided by cabinet 12, the beam 38 is capable of passage through apertures 40 and 42 but for the shutter body 36 when same is interposed in its path, as occurs when the interlock device is effective.

A second, narrower compartment 44 is defined in the body 18 and communicates to the larger compartment 34. A pair of aligned grooves 46 and 48 are formed in opposite inner walls 50 and 52 which serve partially to define the compartment 44. Grooves 46 and 48 open to each other and to the interior of said compartment 44.

The shutter body 36 is of generally rectangular configuration conforming to the interior configuration of compartment 34 to permit linear slidable travel thereof within compartment 34. A ramp 54 is formed on or otherwise is secured to one end 56 of the body 36. The opposite end 58 of the shutter body 36 is provided with a cylindrical pin 60 extending outwardly therefrom and normal relative thereto. A through passage 62 is formed in the shutter body 36 closely adjacent end 56 thereof. Passage 62 is of oversized cross-section as compared to apertures 40 and 42. When the safety interlock device 10 is defeated, the passage 62 is interposed between apertures 40 and 42 to allow unbroken passage of the beam 38. The comparative size of passageway 62 is selected to obviate the necessity for perfect alignment of passageway 62 with the aperatures 40 and 42 to assure that the beam 38 be unobstructed.

The free end of ramp 54 terminates in a plate 64 arranged in a plane parallel to the surface of end 56. An elongate slot 66 is formed in the ramp along the length thereof. A pin 68 is formed or otherwise secured upon the plate 64 extending outwardly normal thereto with its axis substantially coaxial with pin 60. The ramp 54 is inclined downwardly toward the end 56. Locking pin 70 is seated in the slot 66 and maintained therein by a pair of cross pins 72 and 74 passing through suitable cross bores 76, 78 formed in the pin 70.

A cylindrical bore 80 is formed in the body 18 communicating between the interior of compartment 34 and end 22. A plate 82 is secured to end 22 by screw 84 to cover the outlet of bore 80. Helical spring 86 is seated within the bore 80 and is capable of receiving the pin 60.

The length of the spring 86 is selected so that when expanded in its normal condition, the spring 86 serves to bias the shutter 36 to its extreme left hand position within compartment 34. This causes the pin 68 to protrude outward of the cabinet. When the interlock device 10 is effective, extension of the pin 68 from the cabinet 12 provides a clear indication of such effective condition.

The cross pins 72 and 74 seat in grooves 46 and 48 in compartment 44 and hence, when the shutter body 36 slidably is moved, the pin 70 remains stationary relative to the length of compartment 34 but is raised and lowered vertically. A pair of aligned openings 88, 90 are formed in the bottom wall 28 and in the cover 30. These openings 88 and 90 are located so that the opening 90 functions as a retaining seat for the pin 70 while opening 88 enables the pin 70 to pass therethrough when raised as the inclined ramp is moved slidably with the body 36.

A plate 92 is secured to the body 18 through suitable openings formed in cover 30. Spacers 96 are provided to space the plate 92 a predetermined distance from the cover 30 defining a passage 98. An aperture 100 is formed in plate 92. Aperture 100 is aligned with the openings 88 and 90 so that the locking pin 70 can be accommodated therein when thrust outwardly by the movement of ramp 54. During such condition, pin 70 blocks the passage 98.

The safety interlock device 10 includes latch bracket 102 on the access door 14 utilized to gain access to the cabinet 12. The latch bracket 102 includes a mounting bracket 106 having mounting tabs 108 and a generally flat arm 110 including a slotted arm portion 112 arranged coplanar but angular relative the unperforate portion of arm 110. The latch is secured to the access door 14 at a location enabling the arm 110 to be freely movable in passage 98 defined between the cover 30 and the plate 92 except when the passage 98 is blocked by the pin 70. So long as the door 14 is closed, the passage 98 is blocked. However the slotted portion 112 of arm 110 is movable through said passage 98 to a limited degree determined by the length of the slot 114. When the door 14 is opened the imperforate portion of arm 110 is first withdrawn. Since the interlock 10 still is in defeated or partially defeated condition, the locking pin 70 is in interferent condition relative said passage 98 and passes through slot 114 of said slotted arm 112. The pin 70 blocks full withdrawal of arm 110. The door 14 thus can be opened only to a limited extent if the interlock is defeated, the length of the slot determining the extent of such opening.

The slot 114 preferably is arcuate. In such case, the door 14 is arranged to swing on an arc about its pivot connection at hinge 104' so the arm 102 follows the same arc with the same radius. In the drawing, the condition shown in broken lines has been shortened to keep within the page. It should be understood that the pin is disposed always centered in the slot relative to the edges thereof so a smooth movement is effected.

The bias of spring 86 forces the shutter toward its blocking condition relative to the beam 38 carrying the ramp 54 to the left and thus lowering the pin 70. With the interlock 10 thus being effective when the shutter 36 and ramp 54 have completed the full extent of movement to the left, the arm 110 may be withdrawn from passage 98. The door 14 may be fully opened and the pin 68 is fully extended outward of the body 18.

Defeat of the interlock is effected when the shutter is forced to the right against the bias of spring 86. As long as the interlock is not defeated, the arm 110 is capable of free passage between the plate 92 and cover 30, since the pin 70 is retracted from its blocking condition.

As the access door 14 is closed, the spring 86 is compressed. The pin 68 is fully retracted within the cavity 34 and the locking pin 70 is positioned at the top of the ramp 54 so that it protrudes in blocking condition in passage 98. One desiring to defeat the safety interlock device can place tape over the pin 68 so that the normal bias of the spring 86 is insufficient to overcome the tape barrier and hence the alignment of the passage 62 with apertures 40 and 42 is maintained and the laser beam 38 is permitted to pass. However, in such event, say the door 14 cannot be opened past a fraction as the arm portion 112 is incapable of being removed from passageway 98. If defeat is attempted while the access door 104 is fully open and the interlock then defeated, the door cannot be closed as the arm 110 cannot pass the protruding locking pin 70.

Thus, during operation of the radiation beam using instrument, the safety interlock device 10 is not intended to be activated. During maintenance, the safety interlock device 10 is activated automatically when the access door carrying latch 102 is opened. During service involving other than alignment or collimation of the radiation beam 38, the interlock device is activated and the protrusion outward of pin 68 from the cabinet provides visible indication that the safety device is in its activated condition. To enable service operations to be effected which require the passage of the beam 38 (as for collimation) the interlock device 10 can be defeated manually by pushing pin 68 inward of body 18. As the access door is being closed, the safety interlock device 10 is defeated automatically. The locking pin 70 passes through slot 114 when the access door 14 is closed and hence, the arm 110 cannot be removed and the door freely opened if the interlock remains defeated. The door cannot be closed, if opened, if and while the interlock is defeated.

Note that the locking pin 70 is positively driven both inwardly and outwardly between the said clear and blocking conditions because of the inclined plane upon which it rides and which is straddled by the pins 72 and 74 seating the pin 70 in slot 66.

Plate 64 is provided so that when the interlock is undefeated, the plate is flush with the edge of the body and, so that as plate moves inward with the pin 68 to defeated condition of the interlock device, the passage 52 substantially is sealed. Not only is the interior of the body 18 protected from foreign matter but forced entry into the interior of the interlock device is prevented.

What I claim is:

1. A safety interlock device for securing a protective enclosure within which radiation emitting means is employed, the enclosure having an access opening and dislodgeable means for preventing entry to said access opening, the safety interlock device serving to prevent exposure to said radiation when entry is gained to said enclosure: said safety interlock device comprising; a housing receivable within said enclosure, spring-biased shutter means within said housing and capable to block said radiation when said entry is gained, said shutter means movable within said housing between an active blocking condition and a defeated condition permitting passage of such radiation, indicating means coupled to said shutter means to establish visible indication when said shutter means is disposed in blocking condition, latch means secured to said dislodgeable means and being movable in a restricted path adjacent said housing, means defining said restricted path and control means coupled to said shutter means to limit movement of said latch means in said path during the defeated condition of said interlock whereby free entry cannot be obtained while said shutter interlock device is defeated.

2. The safety interlock device as claimed in claim 1 wherein said latch means includes a slotted portion, said slotted portion being slidably movable in said restricted path, and said control means comprises locking pin means coupled to said shutter means for movement into and out of blocking condition relative to said restricted path.

3. The safety interlock device as claimed in claim 2 in which said locking pin means include a locking pin and said shutter means includes ramp means, said locking pin being positioned to be raised and lowered by movement of said ramp means.

4. The safety interlock device as claimed in claim 1 in which said dislodgeable means, once dislodged, cannot be returned to entry preventing condition while the interlock is defeated.

5. The safety interlock device as claimed in claim 3 in which said indicating means comprise a pin secured to the shutter means by the ramp means.

6. The safety interlock device as claimed in claim 5 in which biasing means are disposed within said housing capable of biasing said indicating means outward of said housing when said shutter is in blocking condition.

7. The safety interlock device as claimed in claim 3 wherein said ramp means comprise a downwardly inclined ramp capable of urging said locking pin vertically to the said blocking condition thereof when the interlock device is defeated.

8. The safety interlock device as claimed in claim 7 in which the ramp is slotted, and there are means retaining said locking pin within the slot and means permitting only vertical movement of said locking pin upon linear movement of said ramp.

9. The safety interlock device as claimed in claim 8 in which said retaining means comprise pin means coupled to said locking pin and located above and below said ramp, sandwiching same.

10. The safety interlock device as claimed in claim 1 said control means include a ramp coupled to said shutter means and locking pin means coupled thereto, said locking pin means and said ramp being movable relative one another with linear movement of said shutter means, said pin means being vertically reciprocable between a recessed condition when said shutter means are effective to block the radiation and a blocking condition when said shutter means are positioned ineffective to block the radiation.

11. The safety interlock device as claimed in claim 2 in which said locking pin means extend through the slot of said latch when the latch means are engaged within said path and said interlock device is defeated.

12. The safety interlock device as claimed in claim 2 in which said ramp is slotted and said locking pin is seated within said slotted ramp and is vertically reciprocable between raised and lowered condition with linear movement of said ramp.

13. The safety interlock device as claimed in claim 1 wherein said indicating means comprise a pin secured to the shutter means for movement with linear movement thereof, said pin being positioned to protrude from said housing when the interlock device is undefeated.

14. The safety interlock device as claimed in claim 1 wherein the restricted path is defined by a plate member secured to the housing over said locking pin and means spacing said plate from said housing, said locking pin being movable with linear movement of the shutter means between a condition blocking said path and a recessed condition non-interferent with passage of said latch portion between the plate and housing.

* * * * *